(12) United States Patent
Nistor et al.

(10) Patent No.: US 8,324,572 B2
(45) Date of Patent: Dec. 4, 2012

(54) RADIOMETRIC FILL LEVEL MEASURING ARRANGEMENT

(75) Inventors: Alecsandru Nistor, Grenzach-Wyhlen (DE); Jochen Politt, Rheinfelden (DE); Markus Bühler, Maulburg (DE)

(73) Assignee: Endress + Hauser Flowtec AG, Maulburg (DE)

( * ) Notice: Subject to any disclaimer, the term of this patent is extended or adjusted under 35 U.S.C. 154(b) by 464 days.

(21) Appl. No.: 12/457,026

(22) Filed: May 29, 2009

(65) Prior Publication Data

US 2010/0302089 A1 Dec. 2, 2010

(51) Int. Cl.
*G01N 23/00* (2006.01)
(52) U.S. Cl. .............. 250/308; 250/357.1; 250/343
(58) Field of Classification Search .............. 250/308, 250/357.1, 343
See application file for complete search history.

(56) References Cited

U.S. PATENT DOCUMENTS

| | | | | |
|---|---|---|---|---|
| 2,960,607 | A * | 11/1960 | Kohl | 137/172 |
| 4,038,548 | A * | 7/1977 | Charlton | 250/357.1 |
| 4,268,753 | A * | 5/1981 | Murakami et al. | 250/357.1 |
| 4,369,368 | A * | 1/1983 | Bernard et al. | 250/357.1 |
| 4,413,182 | A * | 11/1983 | Hearn | 250/357.1 |
| 4,870,278 | A * | 9/1989 | Leonardi-Cattolica et al. | 250/357.1 |
| 5,569,914 | A * | 10/1996 | Ferg | 250/260 |
| 6,548,814 | B1 * | 4/2003 | Gronli | 250/357.1 |
| 6,753,532 | B2 * | 6/2004 | Pfleger | 250/395 |
| 7,128,812 | B1 * | 10/2006 | Cupit | 201/1 |
| 2004/0021080 | A1 * | 2/2004 | Bidell et al. | 250/357.1 |
| 2009/0099808 | A1 * | 4/2009 | Winfield et al. | 702/137 |

* cited by examiner

*Primary Examiner* — Christine Sung
(74) *Attorney, Agent, or Firm* — Bacon & Thomas, PLLC

(57) ABSTRACT

A radiometric measuring arrangement for measuring fill level of a fill substance in a container includes: arranged one above the other in measurement operation on a first side of the container, two or more radiometric radiators, which, in measurement operation, send radioactive radiation through the container, and which, in measurement operation, are arranged in a measuring position in the interior of the container in a pressure resistant, protective tube protruding laterally into the container; and, arranged on a second side of the container lying opposite to the radiators, at least one detector, which serves to receive radiation intensity penetrating through the container as a function of fill level and to convert such into a fill level dependent, electrical signal. The measuring arrangement permits achievement of a highly linear dependence of total detected radiation intensity on fill level. At least in protective tubes, above which at least one further radiator is located, above the radiator of such a protective tube, an absorber is arranged, which serves to absorb radiometric radiation upwardly radiated by the radiator of such protective tube, when such radiator is located in the measuring position.

4 Claims, 7 Drawing Sheets

RADIOMETRIC FILL LEVEL MEASURING ARRANGEMENT

TECHNICAL FIELD

The invention relates to a radiometric measuring arrangement for measuring fill level of a fill substance in a container. The arrangement includes two or more radiometric radiators arranged in measurement operation on a first side of the container in the interior of the container one above the other. In measurement operation, the radiators send radioactive radiation through the container. The arrangement further includes at least one detector arranged externally on the container on a second side of the container lying opposite to the first side. The detector serves for receiving radiation penetrating through the container. The intensity of the received radiation is a function of fill level. The detector converts the received radiation into an electrical signal dependent on fill level.

BACKGROUND DISCUSSION

Radiometric measuring arrangements are usually applied when conventional fill level measuring devices are not applicable, due to special requirements at the measuring location. For instance, very frequently, extremely high temperatures and pressures reign at the measuring location, or chemically and/or mechanically very aggressive, environmental influences are present, which make the use of other measuring methods impossible.

Especially in the case of very high containers, measuring arrangements are frequently used, wherein two or more radioactive radiators are placed externally on a side of the container, one above the other, in order to cover the entire measurable height of the container with radioactive radiation.

Used as radiators are e.g. Co 60 or Cs 137 preparations placed in a radiation protection container. The radiation protection containers have an opening, through which the radiation emitted by the radiator escapes. A radiation direction is selected, such that the radiation penetrates those regions of the container to be registered for the measurements. In the case of a plurality of radiators installed one above the other, the exit openings are preferably directed in such a manner, that the sum of the resulting radiation cones covers the total measuring range as uniformly as possible.

On the oppositely lying side, the radiation intensity emerging from the container is quantitatively registered with a detector. The radiation intensity depends on geometric arrangement and absorption. The latter depends on the amount of fill substance in the path of the radiation in the container. As a result, total radiation intensity detected by the detector is a measure for current fill level of fill substance in the container.

A suitable detector is e.g. a scintillation detector equipped with a rod-shaped, solid scintillator and an optoelectrical transducer, such as e.g. a photomultiplier. Gamma radiation is converted by the scintillation material into light flashes, which are registered by the photomultiplier and converted into electrical pulses. The pulse rate, with which the pulses occur, depends on the total radiation intensity impinging on the detector and, thus, is a measure for the fill level.

The detector includes, as a rule, an electronics, which makes available to a superordinated unit an output signal corresponding to the pulse rate. The electronics comprises usually a control system and a counter. The electrical pulses are counted and a counting rate derived, on the basis of which fill level is ascertained.

There are, however, a number of applications, in which, e.g. due to very high pressures occurring in the container, very thick-walled containers must be applied. If one would apply, in such case, radiators located in radiation protection containers outside of the container, the radiation would have to pass through two thick container walls on the path from the radiator to the detector. In order that, in this case, a radiation intensity sufficient for the fill level measurement can arrive at the detector, radiators with very high activities, or very high energy isotopes, must be applied, such as cobalt, for instance. High activities are, however, undesirable, for reasons of radiation protection. High energy isotopes have, as a rule, a markedly smaller half life and must, accordingly, be replaced more often.

Instead, the radiators are preferably placed in pressure resistant, protective tubes inserted laterally through bores in the container wall. The radiators are located, therewith, in the interior of the container, so that their radiation need penetrate only one of the two thick container walls on the path to the detector. In this way, the radiative power required for fill level measurement is markedly reduced, and correspondingly weaker radioactive sources can be applied.

In the case of two or more radiators provided in this way, one above the other, in the container, it has been found, however, that, at fill levels around the installation height of the radiator, an extremely non-linear dependence of the measured radiation intensity on fill level is obtained. The reason for this is that the radiators located in the container send radioactive radiation in all directions. An individual radiator not covered by fill substance radiates into regions both above and below its installed height. If, now, the fill level rises sufficiently that the radiator is covered by fill substance, then the entire radiation of the radiator, or at least a very large part thereof, is absorbed by the fill substance. If one starts with an initially empty container, which is filled continuously, then the total radiation intensity falling on the detector sinks first continuously with increasing fill level. As soon as the fill level, however, exceeds the installed height of the radiator, there arises an extremely non-linear dependence of the measured radiation intensity on fill level, since the fill substance now not only absorbs the radiative power of this radiator radiated laterally and downwards but also almost the entire radiative power of this radiator radiated upwardly. A very small changing of the fill level leads, thus, in the case of fill levels in the regions of the installed height of the respective radiator to a very large change in the measured radiation intensity. In this way, there results an extremely non-linear dependence of the total detected radiation intensity on fill level.

SUMMARY OF THE INVENTION

It is an object of the invention to provide a radiometric measuring arrangement for measuring fill level of a fill substance in a container, wherein the arrangement includes: Two or more radiometric radiators arranged in measurement operation one above the other in the interior of the container; and at least one detector, which serves for measuring a fill level dependent radiation intensity penetrating through the container; wherein the arrangement provides that an as linear as possible dependence of the total measured radiation intensity on fill level is achievable.

To this end, the invention resides in a radiometric measuring arrangement for measuring fill level of a fill substance in a container, including:

Two or more radiometric radiators arranged in measurement operation one above the other on a first side of the container,
  for sending, in measurement operation, radioactive radiation through the container, and
  arranged, in measurement operation, in each case, in a measuring position in the interior of the container in a pressure resistant, protective tube protruding laterally into the container,
    wherein there is arranged in the protective tube, at least in the case of particular radiators, above which at least one further radiator is located, over such a particular radiator, an absorber, which serves to absorb radiometric radiation upwardly radiated by the particular radiator, when the particular radiator is located in the measuring position; and,
at least one detector, arranged on a second side of the container lying opposite to the radiators, for receiving radiation intensity penetrating through the container as a function of fill level and for converting such into a fill level dependent, electrical signal.

In a further development,
there is arranged, in each protective tube equipped with an absorber, an insert for accommodating an associated radioactive radiator, and
the absorber is secured on the insert.

In an embodiment, the absorber is composed of steel.

In a first variant of the further development,
the absorbers are horizontally directed, solid cylinders having a bore extending eccentrically in a lower section of the absorber, and
the inserts have, in each case, located in the container, an end,
  in which the associated radiator is located in its measuring position, and
  which is arranged in the bore of the associated absorber.

In a second variant of the further development,
the absorbers are horizontally directed, solid cylinders, which have on their underside a downwardly open cavity extending over the length of the solid cylinder, and
the inserts have, in each case, located in the container, an end,
  in which the associated radiator is located in its measuring position, and
  which is arranged in the cavity of the associated absorber.

Additionally, the invention includes a further development, in the case of which
all protective tubes are equipped in measurement operation with an absorber,
externally on the container there is provided for each radiator a radiation protection container, whose inner space is connected via an opening with an inner space of the associated protective tube,
for each radiator there is provided a transport apparatus, which serves to transport the radiator at the beginning of measurement operation from the radiation protection container through the opening into the protective tube into to a measuring position and, after termination of measurement operation, back into the radiation protection container,
the absorbers extend above the installation height of the radiators over the measuring position and beyond, further into the interior of the container, and
on the ends of the absorbers located in the interior of the container a further absorber segment is provided, which covers a cross section of the opening of the radiation protection container and serves to absorb radiation emerging from the radiation protection container through the opening, while the radiator is located in the radiation protection container.

BRIEF DESCRIPTION OF THE DRAWINGS

The invention and other advantages will now explained in greater detail on the basis of the figures of the drawing, in which four examples of embodiments are presented; equal parts are provided in the figures with equal reference characters.

The figures show as follows.

DETAILED DISCUSSION IN CONJUNCTION WITH THE DRAWINGS

Figure 1:
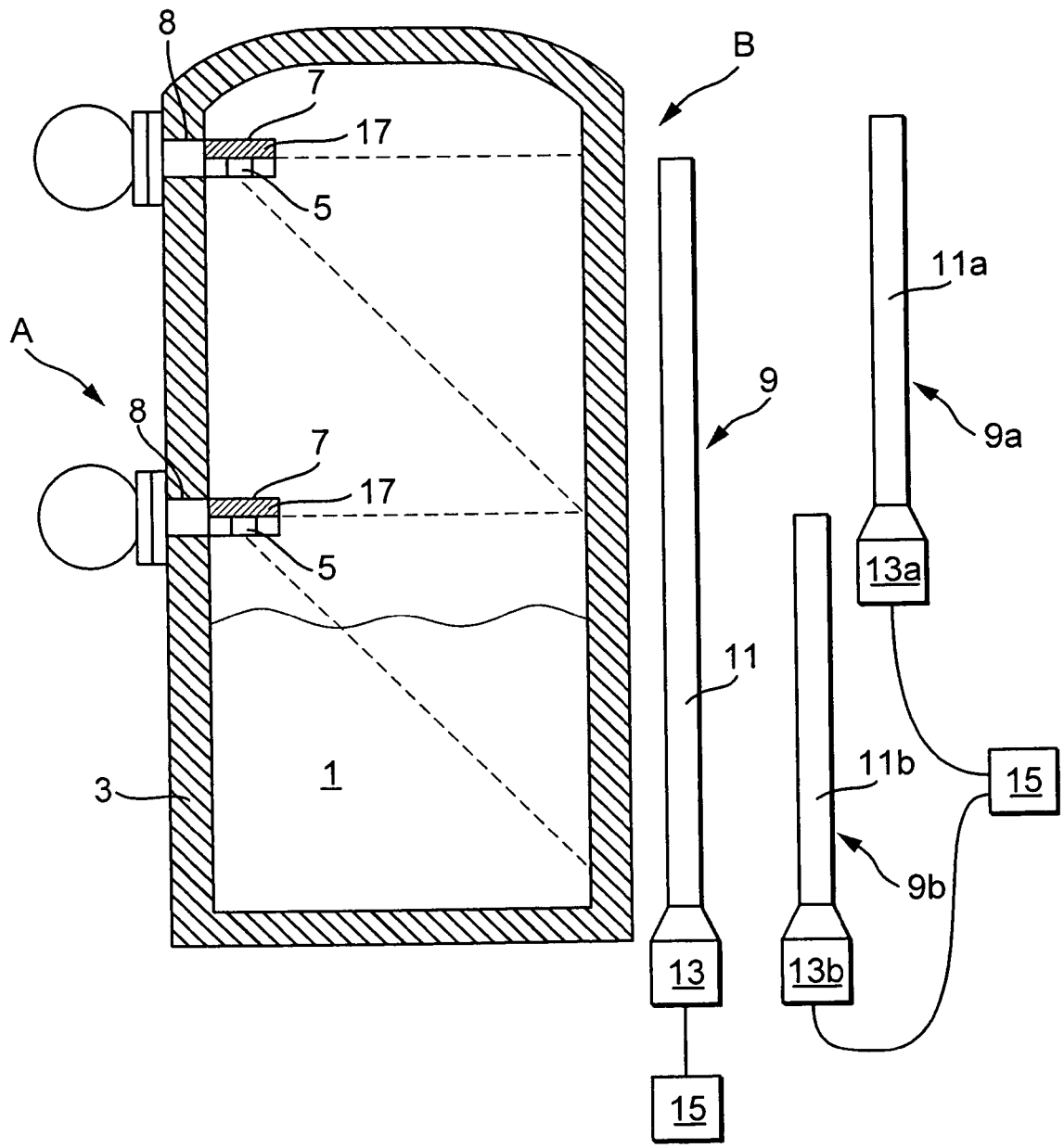
FIG. 1 is a sketch of the principles of a radiometric fill level measuring arrangement of the invention.

FIG. 1 shows a radiometric measuring arrangement of the invention for measuring fill level of a fill substance 1 in a container 3. The shown measuring arrangement includes, here, two radiometric radiators 5 arranged in the container 3 one above the other in measurement operation on a first side A of the container 3. In measurement operation, the radiators 5 send radioactive radiation through the container 3. Of course, as a function of the height of the container 3, or the region to be registered for measurements, also more than two radiators 5 can be arranged one above the other.

For accommodating the radiators 5 in the container 3, in each case, a pressure-resistant protective tube 7 is provided, which, in each case, is inserted laterally into the container 3 through an opening 8 provided in the side wall on the first side A of the container 3. The protective tubes 7 are secured in the openings 8.

In measurement operation, the radiators 5 are placed in the protective tubes 7 and arranged there in a measuring position illustrated in FIG. 1, in which the radiators 5 are located on the first side A of the container 3 laterally in the interior of the container 3.

Provided on the second side B lying opposite to the first side A of the container 3 is a detector 9, which serves to receive radiation intensity penetrating through the container 3 dependent on fill level and to convert such into a fill level dependent, electrical signal.

Suited as detector 9 are, especially, the initially mentioned scintillation rods 11 with the thereto connected, optoelectrical transducers 13. Depending on height of the region to be registered in the measurements, here, naturally also two or more detectors 9a, 9b can be arranged one above the other, in order to be able to cover a greater measuring range. Such an arrangement is shown in FIG. 1, as an alternative to the detector 9, to the right, beside the detector 9. In the case of this variant, two detectors 9a, 9b are placed one above the other in such a manner, that their scintillation rods 11a, 11b cover two measuring range portions located one above the other and bordering one another.

Under the influence of gamma radiation, there occur in the scintillation material light flashes, which are registered with the optoelectrical transducer 13, or with the optoelectrical transducers 13a, 13b, as the case may be, and converted into electrical pulses. Connected to the detector 9, or the detectors 9a, 9b, as the case may be, is an electronics 15, which, on the basis of the entering electrical pulses, ascertains a pulse rate. The electronics 15 comprises, for this, usually a control system and a counter. The electrical pulses are counted and a pulse rate derived, on the basis of which then the fill level is ascertained.

The pulse rate is a measure for the total detected radiation intensity and therewith for the fill level to be measured. Pulse rate and total detected radiation intensity are, consequently, used synonymously in the following.

Figure 2:
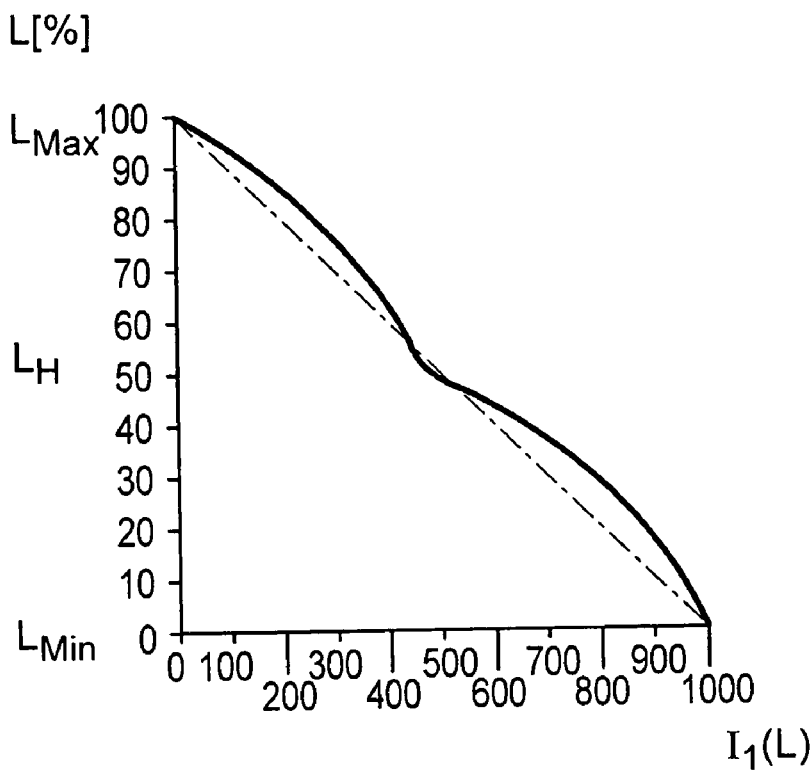
FIG. 2 illustrates the fill level as a function of measured pulse rate, as measured with the arrangement of FIG. 1 with absorbers.
Figure 3:
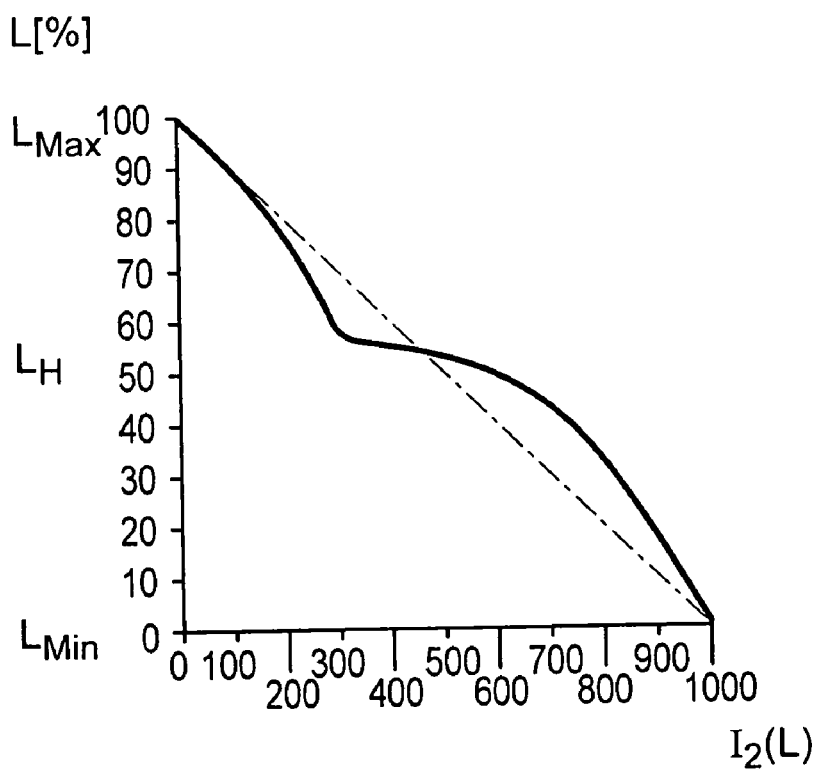
FIG. 3 illustrates the fill level as a function of measured pulse rate, as measured with the arrangement of FIG. 1 without absorbers.

According to the invention, at least in the case of radiators 5, above which at least one further radiator 5 is located, there is arranged in the protective tube 7, over the measuring position of the radiator 5, an absorber 17, which serves to absorb radiometric radiation upwardly radiated by the radiator 5, when the radiator 5 is located in the measuring position. In the illustrated example of an embodiment, supplementally, also the upper protective tube 7 is equipped with the absorber 17. The absorbers 17 are composed, for this, of a radiometric radiation strongly absorbing material, e.g. steel. Alternatively, also steel alloys, copper, lead or tungsten can be used, for example. The absorbers 17 effect that the radiation of the radiators 5 is sent exclusively horizontally laterally and downwards through the container 3. In this way, a very much more linear dependence of the radiation intensity totally detected by the detector 9 on fill level is achieved. For illustrating this effect, plots of fill level as a function of pulse rate, with and without absorber 17, are presented in FIGS. 2 and 3 for comparison. FIG. 2 shows fill level L as a function of normalized measured pulse rate $I_1(L)$ measured with the arrangement of FIG. 1 with absorbers 17 and FIG. 3 shows the dependence between fill level L and normalized measured pulse rate $I_2(L)$ measured with the arrangement of FIG. 1 without absorbers 17 over the total measuring range, which extends from the minimum fill level $L_{min}$ (here, empty container 3) to the maximum fill level $L_{max}$.

The measured pulse rate $I_1(L)$, $I_2(L)$ is in the case of empty container 3, i.e. $L=L_{min}$, maximum and falls with rising fill level L first continuously. Proceeding from an empty container 3, the measured pulse rate $I_1(L)$, $I_2(L)$ sinks in both cases first continuously with rising fill level L, since, with rising fill level L, always more radiation is absorbed in the fill substance 1. However, as soon as the fill level L reaches a height $L_H$, in the case of which the lower radiator 5 is covered by the fill substance 1, the measured radiation intensity $I_2(L)$ shows in FIG. 3 a drastic decline, since now not only the horizontally laterally and downwards radiated radiation of the lower radiator 5, but also almost the entire upwardly emitted radiation of the lower radiator 5 is absorbed by the fill substance 1. This non-linear curve does not occur in the case of the pulse rates $I_1(L)$ measured with absorbers 17, since, then, at no point in time is radiation radiated upwardly by the lower radiator 5. The falling of the pulse rate $I_1(L)$ is, therewith, also almost linear in the region at fill level $L_H$ corresponding to the installation height of the lower radiator 5, i.e. small changes of the fill level L effect also in this region small changes of the measured pulse rate $I_1(L)$. Correspondingly, due to the absorber 17, also an exact fill level measurement can occur in the region of the installation height of the associated radiator 5, while, without absorber 17, this is, without linearizing, practically not possible, due to the illustrated non-linear dependence of the measured pulse rate $I_2(L)$ on fill level L in such regions.

Figure 4:
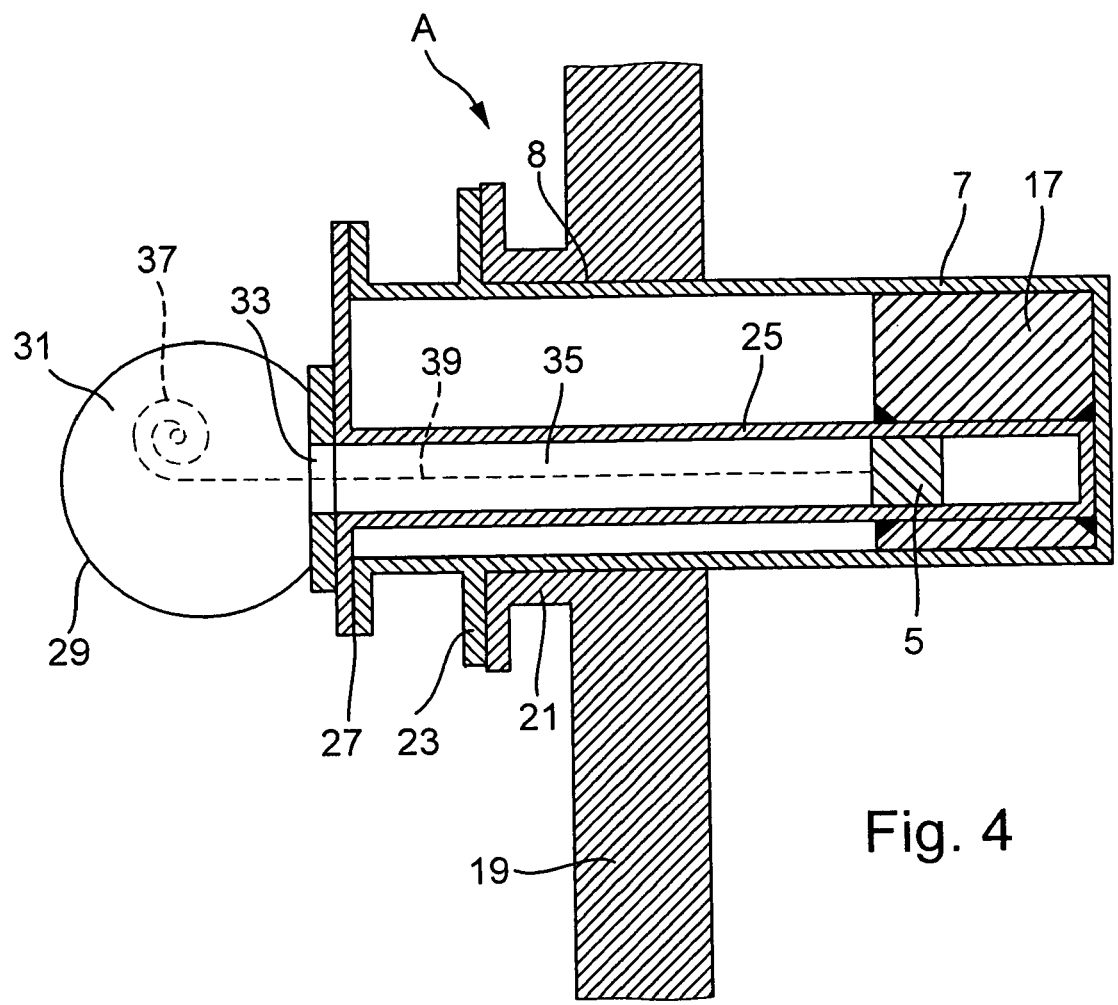
FIG. 4 is a section through a first example of an embodiment of a radiator installed according to the invention in the container, in the measuring position in the case of a solid cylindrical absorber with eccentric bore.

FIG. 4 shows a first example of an embodiment of a radiator 5 in the measuring position installed according to the invention in the container 3.

The protective tube 7 is inserted laterally through the opening 8 in the container wall 19 on the first side A of the container 3 into the container 3 and there secured. For this, externally at the opening 8 a nozzle 21 is placed, on which the protective tube 7 is mounted by means of a flange 23 formed thereon. Inserted in the protective tube 7 is an insert 25, which serves for accommodating the radioactive radiator 5. The insert 25 is, for example, secured by means of a flange connection 27 to an end of the protective tube 7 protruding out of the container 3.

Preferably provided externally on the container 3 for each of the radiators 5 is a radiation protection container 29, whose inner space 31 is connected via an opening 33 with an inner space of the associated protective tube 7. In the illustrated example of an embodiment, the radiation protection container 29 is mounted on the insert 25 connected with the protective tube 7 and the opening 33 connects the inner space 31 of the radiation protection container 29 with the inner space 35 of the insert 25.

Preferably provided for each radiator 5 is a transport apparatus 37, which serves to transport the radiator 5 at the beginning of measurement operation from the radiation protection container 29 through the opening 33 into the protective tube 7 into a measuring position and, after termination of measurement operation, to transport the radiator 5 back into the radiation protection container 29.

Suited as transport apparatus 37 is, for example, a wire rope or a metal rod, on whose free end the radiator 5 is secured.

Fundamentally, the absorbers 17 can, naturally, such as shown in FIG. 1, be arranged and secured directly in the protective tube 7, or be integral components of the protective tubes 7. The protective tubes 7 are, however, as a rule, standard parts, which are placed at the measuring location by the user. Integration of the absorber 17 in the protective tube 7 would accordingly mean a deviation from the standard and, as a rule, would be undesired by the user.

Figure 5:
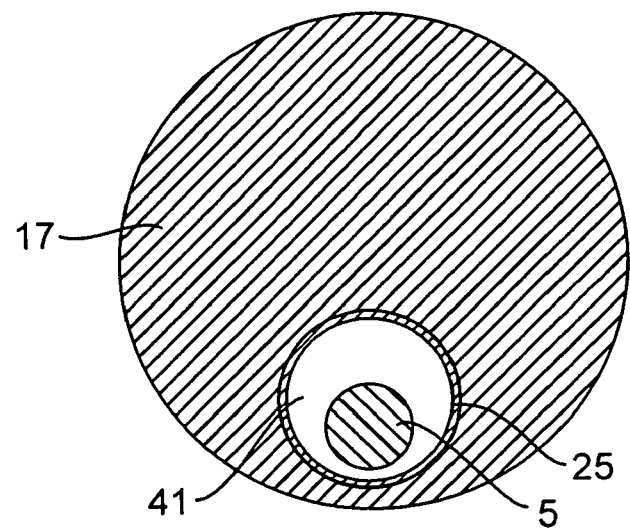
FIG. 5 is a section through the example of an embodiment of FIG. 4 in the region of the measuring position of the radiator.

In order to avoid this, the absorbers 17 are preferably secured to the insert 25. This can be done in very simple and cost-effective manner in the manufacturing, such as shown in the variant of FIG. 4 of an absorber 17 secured to a, here, tubular insert 25. FIG. 5 shows a section through the absorber 17 with the therein installed insert 25 and the radiator 5 therein in the measuring position.

Absorber 17 is, here, a solid cylinder equipped with an eccentric bore 41. The absorber 17 extends horizontally in the protective tube 7 and is oriented in such a manner, that the eccentric bore 41 is located in a lower section of the absorber 17. The end of the insert 25 pointing into the container 3, i.e. the end in which measuring position of the radiator 5 is located, is set into the bore 41 with accurate fit and the absorber 17 is connected fixedly with the insert 25, e.g. welded.

Figure 6:
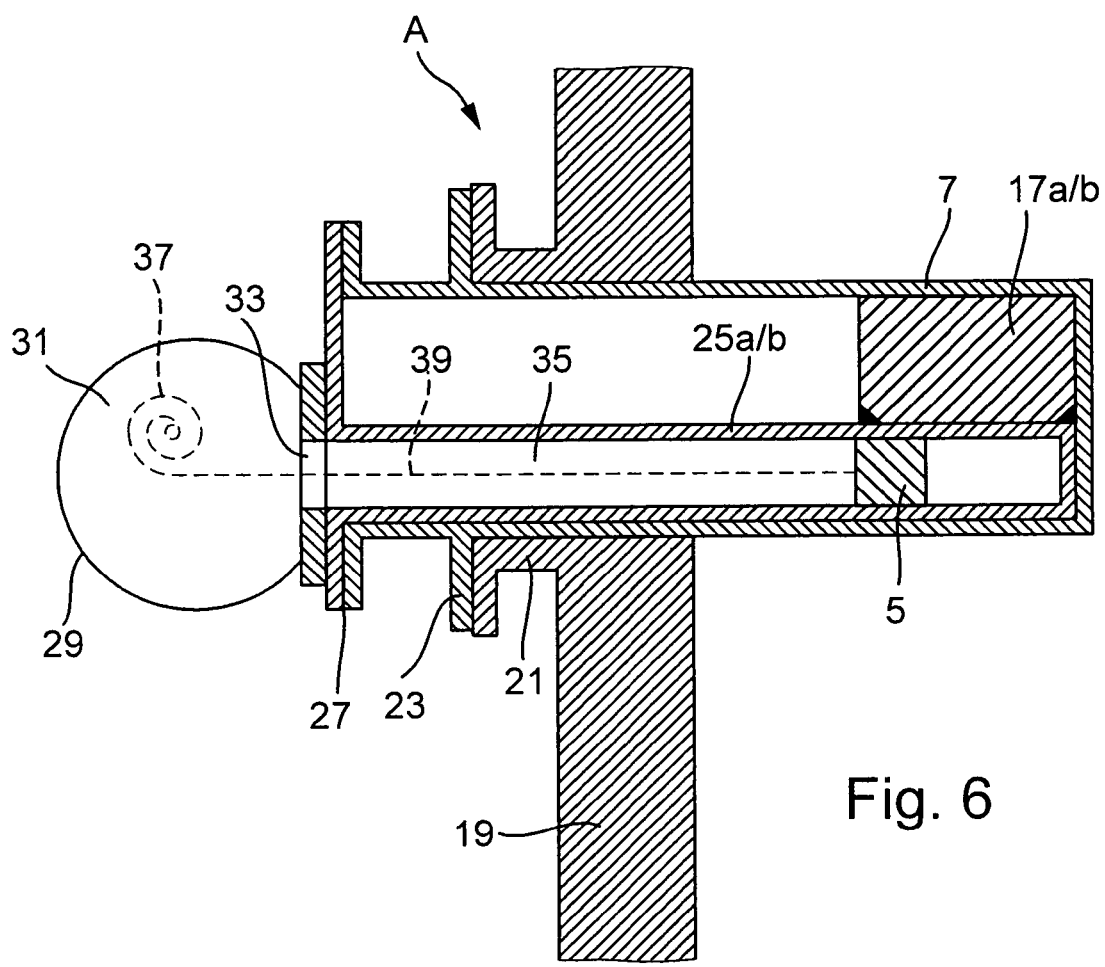
FIG. 6 is a section through a second example of an embodiment of a radiator installed according to the invention in the container, in the measuring position in the case of a solid cylindrical absorber with a cavity extending on its underside in the region of the measuring position of the radiator.

FIG. 6 shows, in this connection, two other examples of embodiments identical in the illustrated cutting plane. Also here, the absorber 17a/b is, in each case, a solid cylinder directed horizontally in measurement operation. This has, in contrast to the variant illustrated in FIGS. 4 and 5, extending on its underside over the length of the solid cylinder, a downwardly open cavity 43a/b, into which the end of the insert 25a/b pointing into the container 3 is set, in which the associated radiator 5 is located in its measuring position. Insert 25a/b and absorber 17a/b are, also here, fixedly connected with one another, e.g. welded.

Figure 7:
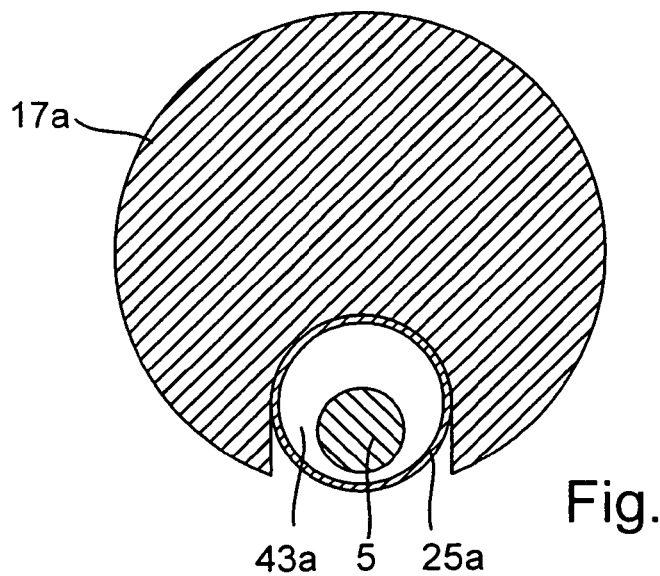
FIG. 7 is a section through the example of an embodiment of FIG. 6 in the region of the measuring position of the radiator, wherein a tubular insert was used.
Figure 8:
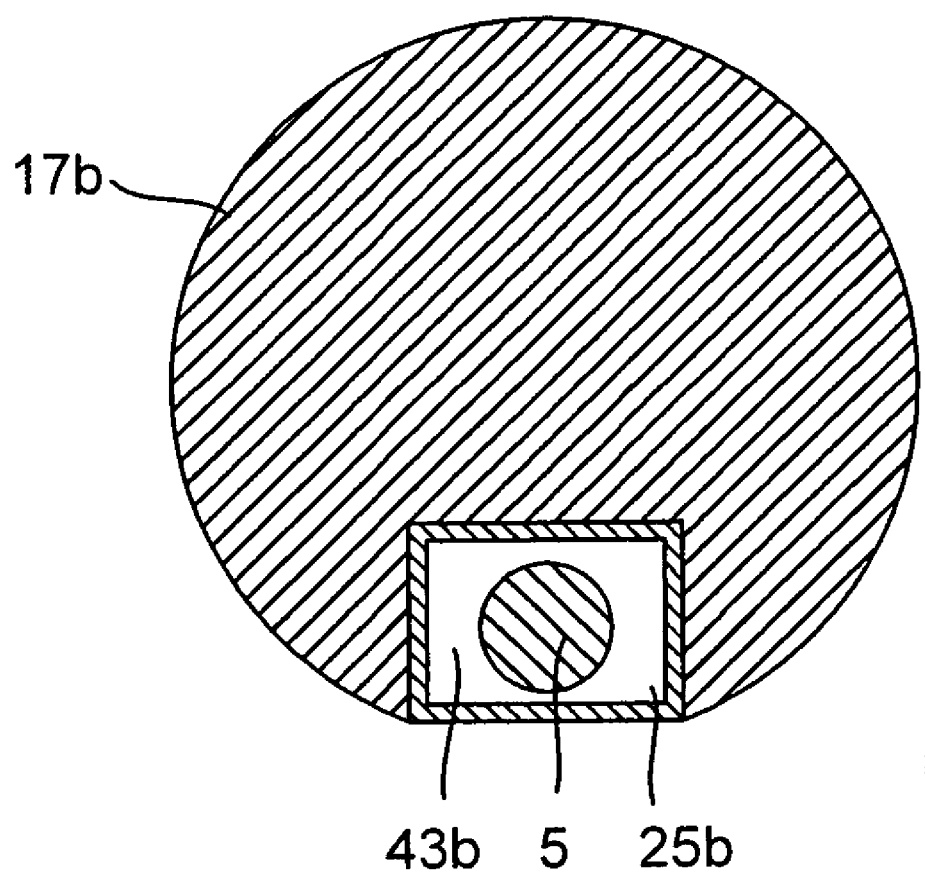
FIG. 8 is a section through the example of an embodiment of FIG. 6 in the region of the measuring position of the radiator, wherein a rod-shaped insert was used.

FIGS. 7 and 8, respectively, sections through the absorbers 17a, 17b, with the therein installed inserts 25a, 25b, and the radiators 5 arranged therein in the measuring position. In the case of the variant illustrated in FIG. 7, the insert 25a is tubular and the downwardly open cavity 43a matches the tube form. In the case of the variant illustrated in FIG. 8, the rod-shaped insert 25b is provided with rectangular cross section, and the downwardly open cavity 43b matches the rod form.

These variants have, relative to the variants illustrated in FIGS. 3 and 4, the advantage, that, below the radiators 5, no absorber material at all is located, so that the radiation can exit downwards unimpeded.

In the case of the above described examples of embodiment, radioactive radiation still penetrates through the container 3, when the radiators 5 are located in the radiation protection container 29. This radiation passes through the opening 33 of the radiation protection container 29 in the horizontal direction, and is, as a rule, undesirable, for reasons of radiation protection.

Figure 9:
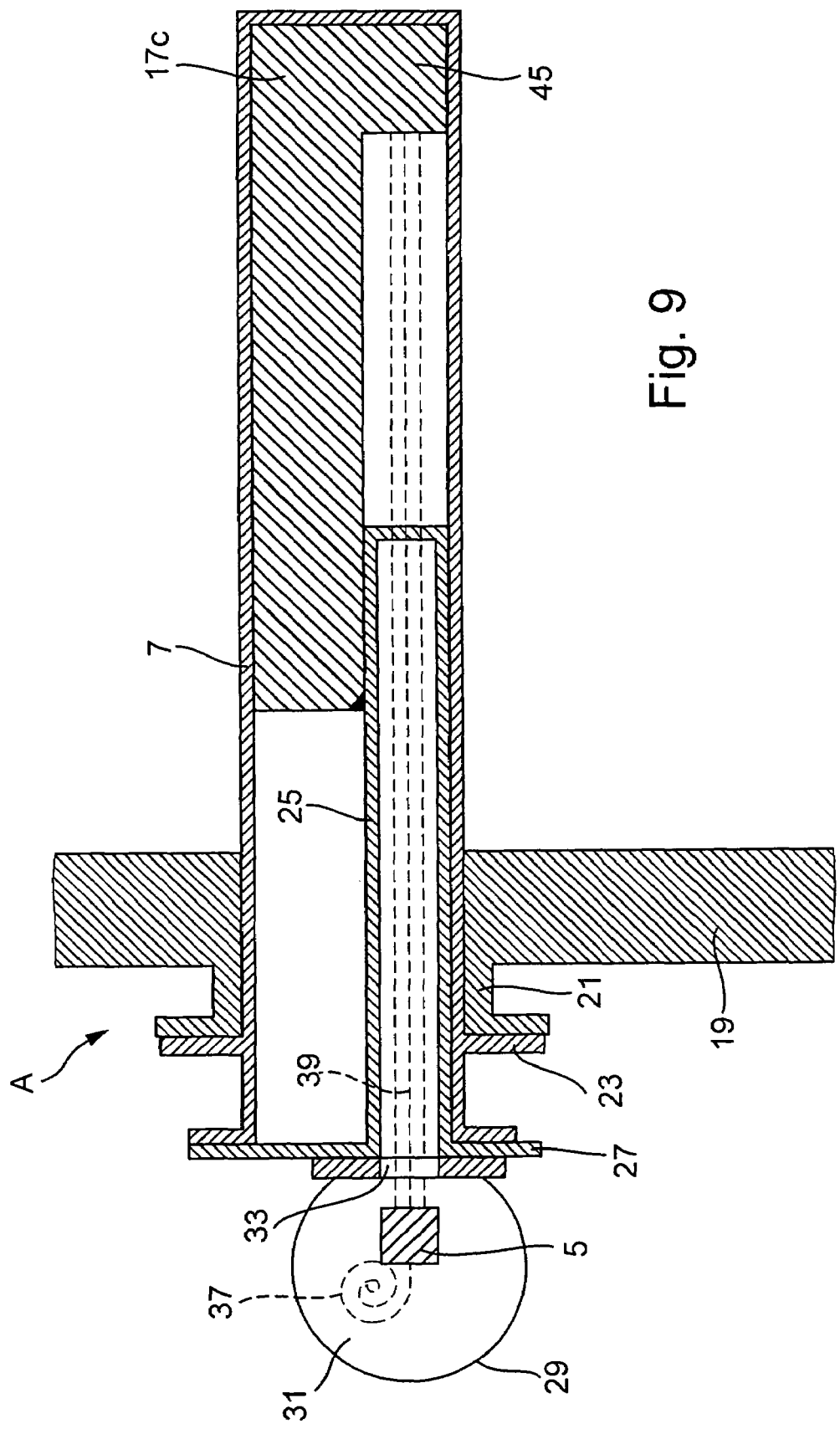
FIG. 9 is a section through a third example of an embodiment of a radiator installed according to the invention in the container, with, extending internally in the container over the measuring position of the radiator and beyond, an absorber, on which, terminally, a further absorber segment is provided, wherein the radiator is located in the radiation protection container.
Figure 10:
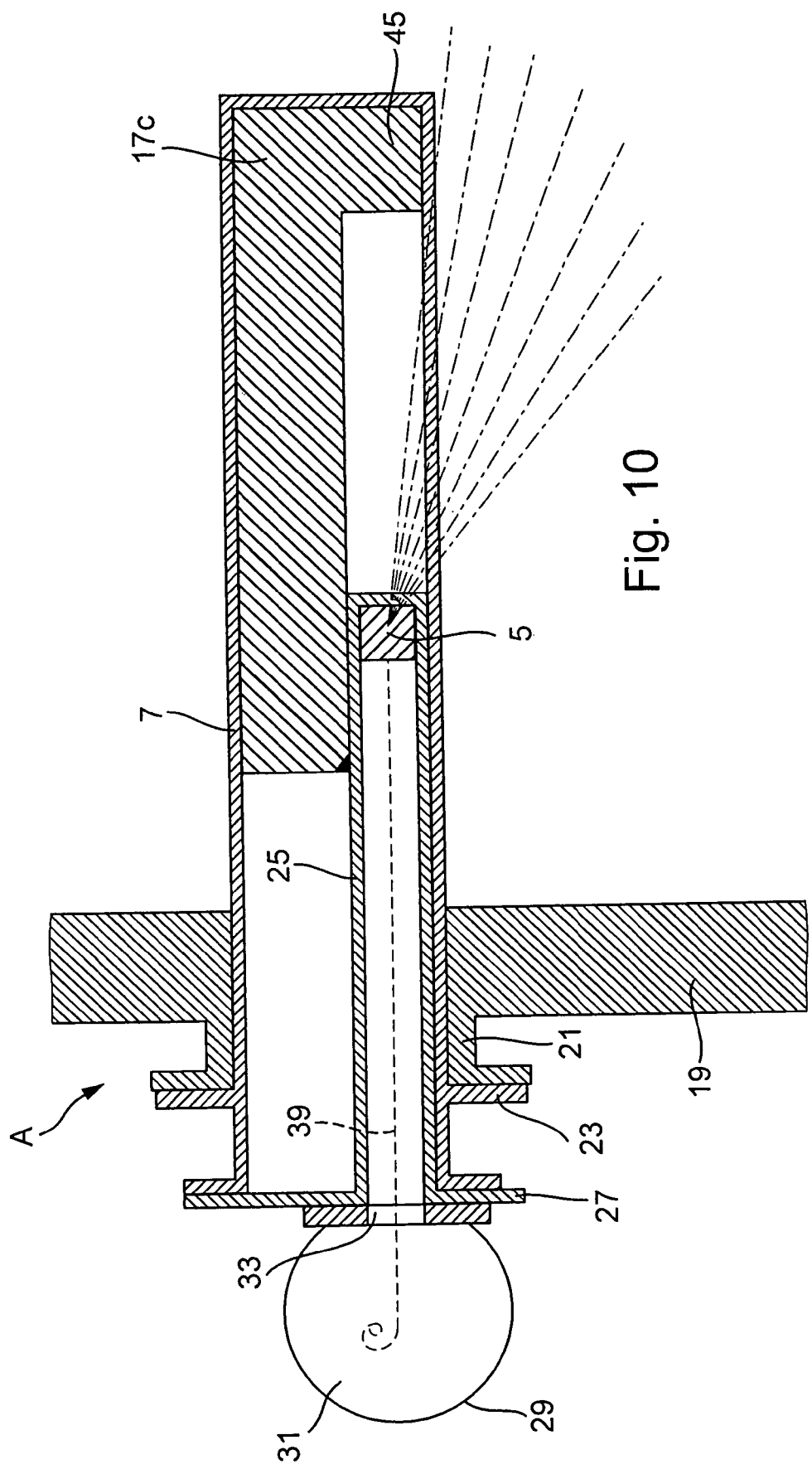
FIG. 10 illustrates an example of the embodiment of FIG. 9, wherein the radiator is located in the measuring position.

FIGS. 9 and 10 show an example of an embodiment of a further development of the invention, with which this radiation emerging in the horizontal direction can be prevented. In the presentation of FIG. 9, the radiator 5 is located in the radiation protection container 29; in the case of the presentation of FIG. 10, the radiator 5 is located in its measuring position. Due to the agreement, for the most part, with the earlier described variants of the invention, only differences will be explained here in detail. If the radiator 5 is located in the radiation protection container 29, then it radiates—such as shown in FIG. 9 by dashed lines—radiation in the horizontal direction through the opening 33 in the protective tube 7, or the therein located insert 25. In order to prevent this radiation from escaping into the container 3, here, an absorber 17c is used, which extends above the installed height of the radiator 5 over the measuring position of the radiators 5 and beyond, further into the interior of the container 3. For this, the absorber 17c protrudes over the end of the insert 25 and beyond, into the container 3. The absorber 17c includes here on its underside a cavity for accommodating the insert 25 and is preferably welded onto the insert 25. On the end of the absorber 17c located in the interior of the container 3 is formed a further absorber segment 45, which covers the cross section of the opening 33 of the radiation protection container 29. In this way, it is effected, that radiation emerging horizontally from the radiation protection container 29 with a radiation cone constrained by the opening 33 to the cross section of the opening 33, impinges on the absorber segment 45 and is absorbed there. For this purpose, naturally, all radiators 5, even the uppermost, are equipped with absorbers 17c and absorber segments 45.

The distance between the additional absorber segment 45 and the measuring position of the radiators 5 in the horizontal direction effects that, in measurement operation, only a very smaller part of the laterally radiated radiation is lost in the absorber segment 45. With appropriate spacing, a low reducing of the cone angle of the radiation cone of the radiators 5 is achievable in its measuring position, e.g. a reduction of around 5°. This is shown in FIG. 10 by the emerging radiation drawn with dashed lines.

The invention claimed is:

1. A radiometric measuring arrangement for measuring fill level of a fill substance in a container, comprising:
    a protective tube mounted to the container and extending into the container and being pressure resistant in its mounting;
    an insert mounted to said protective tube and extending into said protective tube, said insert defining a space;
    a radiometric radiator located in said space of said insert for sending radioactive radiation through the container, and located on a first side of the container;
    an absorber situated in said protective tube and associated with said insert said absorber serving to absorb radiometric radiation radiated by said radiometric radiator which is upwardly radiated;
    a radiation protection container having an interior associated with said space of said insert;
    a transport apparatus, which serves for transporting said radiometric radiator at the beginning of a measurement operation from said radiation protection container through said space to a measuring position in said insert, and after termination of a measurement operation for transporting said radiometric radiator back into said radiation protection container; and
    at least one detector, arranged on a second side of the container lying opposite to said radiometric radiator, for receiving radiation intensity penetrating through the container as a function of fill level and for converting such into a fill level dependent, electrical signal, wherein:
    the container defines an interior;
    said absorber extends above the installed height of said radiometric radiator over said measuring position and beyond, into said interior of the container; and
    on the end of said absorber located in said interior of the container a further absorber segment is provided, which covers a cross section of the opening of said radiation protection container, and serves to absorb radiation emerging from said radiation protection container through the opening, while said radiometric radiator is located in said radiation protection container.

2. The radiometric measuring arrangement as claimed in claim 1, wherein: said absorber comprises steel.

3. The radiometric measuring arrangement as claimed in claim 1, wherein:

said absorber is a horizontally directed, solid cylinder having an eccentric bore extending in a lower section of said absorber; and said insert has located in the container an end, in which the radiator is located in its measuring position, and which is arranged in the bore of the absorber.

4. The radiometric measuring arrangement as claimed in claim 1, wherein:

said absorber is a horizontally directed, solid cylinder, which has on its underside a downwardly open cavity extending over the length of the solid cylinder; and said insert has located in the container an end, in which the associated radiator is located in its measuring position, and which is arranged in the cavity of the associated absorber.

* * * * *